United States Patent Office

Re. 27,662
Reissued June 12, 1973

27,662

COMPOSITIONS AND METHODS FOR TREATING METAL SURFACES

Andrew J. Hamilton, Philadelphia, Pa., assignor to Amchem Products, Inc., Ambler, Pa.

No Drawing. Original No. 3,635,826, dated Jan. 18, 1972, Ser. No. 873,626, Nov. 3, 1969. Application for reissue Aug. 14, 1972, Ser. No. 280,582
Int. Cl. C23f *3/00;* C23g *1/08, 1/12*
U.S. Cl. 252—79.4 20 Claims

Matter enclosed in heavy brackets [ ] appears in the original patent but forms no part of this reissue specification; matter printed in italics indicates the additions made by reissue.

ABSTRACT OF THE DISCLOSURE

Acidic solutions having as an acidic component phosphoric acid and sulfuric acid, as a surfactant component a mixture of primary ethoxylated alcohol and modified polyethoxylated straight chain alcohol, and as a sequestrant component a mixture of oxalic acid and citric acid, are useful in cleaning aluminum, especially drawn and ironed aluminum cans coated with drawing oil, in cleaning, deoxidizing and brightening stainless steel, and in forming corrosion resistant and paint adherent iron phosphate coatings on ferriferous surfaces when applied thereto by the reverse roll coat method.

This invention relates to novel compositions and methods for using them for the treatment of metal surfaces for a variety of purposes. The compositions of the present invention have multiple utilities, since they have been found to functionally interact with different types of metal surfaces in different ways to produce different useful results. In particular the compositions of the invention are useful in the acid cleaning of aluminum surfaces, in the deoxidizing and cleaning of stainless steels, and in the production of iron phosphate coatings on ferriferous surfaces to enhance the corrosion resistance and paint adhesion properties of such surfaces.

In industry it is necessary to clean aluminum surfaces under a variety of circumstances, and alkaline and acidic cleaning solutions have long been used for such purposes. The severity of the cleaning problem is, of course, greatly influenced by the type of industrial processing that the aluminum has been subjected to prior to cleaning, and the kind of surface treatment, if any, which is to follow the cleaning step.

A particularly severe aluminum cleaning problem is encountered in the production of aluminum cans for use as beverage containers, and the compositions of the present invention are outstandingly effective in this environment. In accordance with one widely used system for forming aluminum cans, aluminum sheet, with the ordinary accumulations of manufacturing and warehouse soil on the surface, is subjected to a deep forming operation termed "drawing and ironing." In this operation a water dispersed lubricating oil called a "drawing oil" is used to reduce the friction between the tooling and the aluminum being formed into a can. The dirty, oily, can so formed must then be cleaned so that a chemical pretreatment designed to enhance paint bonding and corrosion resistance can be applied. The chemical pretreatment is then followed by a painting or lacquering operation involving one or more organic siccative finishes.

Some of the factors which make the aluminum can cleaning operation just described a difficult one to perform successfully can be identified. Cost considerations as a practical matter prohibit the use of any cleaning system in which the cleaning material is used on a once-only basis and is immediately flushed to the sewer. Substantially any material which is capable of successfully attacking and removing soils from an aluminum surface will also dissolve some aluminum. This circumstance, coupled with the economic necessity for recycling the cleaner for reuse means that the cleaning bath, as it ages, will contain increasing amounts of dissolved aluminum. At some point, depending upon the particular chemicals employed in the cleaner and various operating conditions, insoluble aluminum compounds will tend to drop out of the cleaning solution in the form of sludge. Such sludge causes both cleaning problems and equipment problems. If the sludge redeposits as a film or smut on the aluminum which has just been cleaned, then the object of the cleaning operation, to some extent, has been defeated. The equipment difficulties caused by sludge can include clogging of spray heads, and the formation of hard clay deposits on tank heating coils which interfere with heat transfer into the bath. Even if such major difficulties are avoided, the build-up sludge in the cleaning equipment does require periodic shutdowns for costly sludge removal operations.

Just as most acidic cleaning materials capable of attacking the soils on the aluminum will also attack the aluminum itself, they will also to some extent attack the cleaning equipment, that is, the tank, pumps, lines, and spray heads. In most installations, part or all of this equipment is formed of stainless steel, and it is thus a requirement of a good aluminum cleaning solution that it have a low rate of attack or corrosion on stainless steel. The equipment corrosion problem is most acute at the steam coils or fire tubes in the cleaning tank. The high temperatures and high local concentrations resulting from localized boiling or ebullition at the heating element surface are the cause of this aggravation of the equipment corrosion problem.

The presence of the above-mentioned drawing oil as a soil on the cans which are presented to the cleaning solution creates further problems. Such oils are commonly used in the drawing machines as water emulsions with an oil concentration of about 4 to 14%. The emulsion is formed before the oil is delivered to the drawing equipment, and while the emulsion remains fairly stable during its residence time in the drawing equipment, it is not an emulsion with long-term stability. The short emulsion life of the oil is, in fact, a desired characteristic, since economic considerations sometimes make it attractive to recover the oil, after the emulsion has broken, for reuse. Those skilled in the art know that surfactants are often desirable components of a cleaning material, to aid in the wetting of the surface being cleaned, and in the removal of soils. It is also known that many surfactants contribute to the establishment of stable emulsions of oil and water. Yet a stable oil-in-water emulsion in the cleaning solution is undesirable. If the oil emulsion is stabilized by the surface-active components of a cleaner, the oil concentration will build up as the cleaning solution is recycled, and the emulsion will eventually tend to break at a relatively high oil concentration. Under such circumstances, there is a great danger that the breaking of the emulsion will occur when the cleaning solution is in contact with the aluminum surface. When this occurs, the oil redeposits on the surface, this partially or wholly defeating the object of the cleaning. It is thus desired that the cleaning solution have a set of surface active properties which meet somewhat incompatible performance requirements: the solution should have sufficient activity to lift the emulsified drawing oil (and other soils) from the surface, and at the same time, have a low enough surface activity to enable the unstable drawing oil emulsion to readily break, thus allowing the oil to separate and float on the surface of the cleaning solution tank, where it may readily be removed, and thereby prevented from being recycled with the cleaning solution back to the aluminum surfaces being cleaned.

The type of cleaning equipment which is usually used for cleaning aluminum cans is of the spray type, including a cabinet having spray nozzles in it and a solution tank positioned beneath the cabinet to catch solution falling from the cans after contacting them. The solution tank contains the heating element. Solution is pumped from the tank through lines to the spray nozzles where it is sprayed against cans being conveyed through the cabinet and then falls back into the solution tank. When a cleaning solution is used in such apparatus it can be seen that it is subjected to considerable turbulence. For this reason it is desirable that the solution be of the low-foaming type.

One of the objects of the invention is the provision of compositions capable of cleaning aluminum, even in the severe cleaning environment of an aluminum can operation, which compositions overcome all of the problems outlined above.

The removal of dirt and scale from stainless steel has long been regarded as a difficult metal cleaning problem. In particular, the oxide scales resulting from annealing operations are difficult to remove effectively and safely. The standard cleaning or pickling solutions of the kind that are effective on other kinds of steel, besides being slow acting when applied to stainless steels, also often result in pitting and uneven cleaning, as well as hydrogen embrittlement of the stainless steel. The compositions of the present invention are effective to remove oxide from stainless steel surfaces, especially oxide resulting from annealing, and it has been discovered that they have the added effect of brightening the stainless steel following oxide removal. These objects are accomplished at the same time that the foregoing problems of selective attack or pitting and hydrogen embrittlement are overcome.

The application of iron phosphate coatings to ferriferous surfaces has long been practiced for the purpose of imparting corrosion resistance and good paint adhesion properties to the ferriferous surface. The art has developed a variety of formulations of iron phosphate coating materials for use in conventional coating apparatus of the dip or spray type. A newer method of applying chemically protective coatings to metals has come into wide use recently. This method is known as "reverse roll coating." In this connection see U.S. Patents 3,098,755 and 3,215,564. In this coating application process, the coating solution is applied to a moving metal surface by means of a feed roller whose surface is wetted with the coating solution and is rotating in a direction reversed or opposite to that in which the metal surface is moving past the roller surface. This coating technique is particularly suited to applying coating solution to metal in strip form.

The reverse roller coating technique has a number of advantages over other techniques for applying conversion coating solutions to metal surfaces. For example, with respect to that method of applying the coating solution by moving the metal surface past or over a roll or rollers which are rotating or moving in the same direction as the metal surface, the reverse roller coating technique has the advantages that the coatings can be applied to the surface with greater rapidity and without sacrificing coating quality; in many applications, an improvement in coating quality is obtained. These advantages are realized also when the reverse roller coating technique is compared with other application methods, such as spraying and immersion methods.

The use of reverse roller coating for the application of iron phosphate coatings to ferriferous metals has been more difficult to achieve with conventional iron phosphating solutions than has the application of other chemical coating systems by reverse roll coating. One reason is that the residence time, or dwell time, of the solution in active contact with the surface is inherently short in the reverse roll coating method. Additionally, some difficulty has been encountered in obtaining the necessary smooth spreading properties for the solutions when they are applied by means of a roller. The compositions of the present invention overcome both of these problems and produce good quality effective iron phosphate coatings when applied by the reverse roll coat method.

From the foregoing discussion it can be seen that among the objects of the present invention are the following:

The provision of improved compositions and methods suitable for use in cleaning of aluminum, which are especially useful in cleaning aluminum cans and the like in the course of manufacture;

The provision of improved compositions and methods for the cleaning, deoxidizing and brightening of stainless steel;

The provision of compositions and methods for the application of iron phosphate coatings to ferriferous surfaces by the use of reverse roller coating techniques; and The provision of novel compositions of wide versatility when used for the treatment of metal surfaces.

The compositions of the present invention are multicomponent systems, and for convenience the various components will be discussed separately, although it must be understood that the components do not function in isolation from one another, but cooperate to produce the new and improved results discussed above.

In their preferred form, the compositions of the invention are concentrates which may be diluted with water to a use concentration appropriate for the particular application, but the invention may also be practiced by making solutions at use concentration directly from raw materials. The method aspects of the invention will be brought out further in the following discussion.

The compositions of the invention are aqueous acidic solutions containing both phosphoric acid and sulphuric acid. By utilizing these acids together, desirable effects are obtained which are unavailable if only one is employed. Phosphoric acid is a desirable material from the standpoint of the cleaning utilities of the invention since it does not attack the metal cleaned (aluminum or stainless steel) or the metal normally used in the cleaning equipment (stainless steel) as vigorously as the stronger inorganic acids which are used from time to time in acidic cleaners. In connection with the phosphate coating aspect of the invention the phosphoric acid serves as a source for phosphate ion. The sulphuric acid portion of the acid component serves in all of the use contexts discussed above to lower the pH of the solutions, without completely obliterating the underlying character of the solutions as phosphate-type materials.

The use of a blend of phosphoric and sulphuric acid yields a number of further advantages in the context of aluminum can cleaning, when compared to other acidic aluminum cleaning compositions utilizing phosphoric acid only. The use of sulphuric acid with the phosphoric acid makes possible the use of a relatively lower phosphate concentration, and, as pointed out above, results in a lower solution pH. These two circumstances contribute materially to increasing the aluminum carrying capacity of the solution over earlier solutions using phosphoric acid only. The term "aluminum carrying capacity" is an expression intended to describe the ability of the solutions to hold aluminum in soluble form. When phosphoric acid based materials are used to clean aluminum, the sludge which will tend to form is aluminum phosphate, which is soluble below a pH of about 2.0. The use of sulphuric acid in conjunction with phosphoric acid results in a solution having a normal pH below 2.0, thus increasing the aluminum carrying capacity. In addition, since sulphuric acid serves as a source of hydrogen ions, relieving the phosphoric acid in part from this function, the relative phosphate concentration can be lower, and the driving force for the formation of aluminum phosphate is reduced.

The lower pH obtained by the use of a combination of acids also reduces the ability of the solution to emulsify oil, and as pointed out above, this is a desirable property when emulsifiable oils, such as drawing oils, are among the soils which must be removed from the aluminum.

Other advantages flow from the use of both sulphuric and phosphoric acid in the compositions of the invention. In aluminum cleaning, the cleaned surfaces are bright even though sulphuric acid is used, by reason of the presence of phosphoric acid. In addition, the blend of acids has a minimal rate of attack upon the washer equipment, which is ordinarily stainless steel.

In the context of stainless steel cleaning, deoxidizing and brightening, the blend of sulphuric and phosphoric acids is also superior to the performance of either type of acid alone for the same purpose. The action of the solutions on stainless steel is faster than that of solutions based on phosphoric acid alone, but is not as severe as the action resulting from the use of solutions based on sulphuric acid alone.

In accordance with the invention, not all blends of mixtures of phosphoric and sulphuric acid yield the desirable results described above. At use concentrations, the acid component should be from about [0.001] *0.1%* to about [0.05] *0.5%* for aluminum cleaning applications, from about [0.003] *0.3%* to about [0.015] *1.5%* for stainless steel cleaning and brightening applications, and from about [0.0015] *0.15%* to about [0.015] *1.5%* for reverse roll iron phosphating applications. Within each of the foregoing ranges are preferred concentration ranges for the acid component. For aluminum cleaning it is preferred that the concentration be between about [0.0025] *0.25%* and [0.0035] *0.35%*, for stainless steel cleaning and brightening, between about [0.004] *0.4%* and about [0.0075] *0.75%* and for reverse roll iron phosphating between about [0.0075] *0.75%* and about [0.0105] *1.05%*. The percentages just given are weight percentages calculated on the basis of 66° Bé. sulfuric acid and 75% phosphoric acid as acid sources. The foregoing desirable effects have also been found to be dependent upon the ratios of sulphuric acid to phosphoric acid. Such ratios may be most conveniently expressed as volume ratios of sulphuric acid (as 66° Bé. $H_2SO_4$) to phosphoric acid (as 75% $H_3PO_4$). In such terms, the ratio of sulphuric acid to phosphoric acid to produce the desired effects runs between about 0.5 to 1 to about 1.5 to 1, with a preferred ratio being in the range of about 0.8 to 1 to about 1.2 to 1.

A second component of the compositions of the invention is a surfactant component. While various single surface active agents may be used as well as many various blends of surface active agents, I have found that a blend of a primary ethoxylated alcohol sold under the name of Neodol 25–7, and a modified polyethoxylated straight chain alcohol, sold under the name of Triton DF–18, provides very satisfactory results in all of the above discussed areas of utility, especially in the aluminum cleaning context where an emulsifiable oil is present as a surface soil. For aluminum cleaning the total concentration of the surfactant component should be from about [0.0010] *0.10%* to about [0.0035] *0.35%* by weight at use concentration and when the compositions of the invention are used for cleaning and brightening stainless steel, the total concentration of the surfactant component should be from about [0.003] *0.3%* to about [0.007] *0.7%*, again at use concentration. When the compositions are used for iron phosphating by the reverse roll coat method, the surfactant component should be present in an amount from about [0.0013] *0.13%* to about [0.013] *1.3%*. When the preferred surfactants just mentioned are employed, their weight ratio should be from about 2.25 to about 1.75 to 1 expressed as primary ethoxylated alcohol/modified polyethoxylated straight chain alcohol, for all three of the applications.

Another component of the compositions of the present invention is termed here a "sequestrant component," since, in the various ways the compositions are used, the sequestering action of the materials used in this component appears to contribute materially to the overall action of the compositions. However, as brought out more fully below, the materials in the sequestrant component also produce other desirable effects. The sequestrant component of the present invention is made up of a blend of oxalic acid and citric acid. When the compositions of the invention are used for aluminum cleaning, the total concentration of the sequestrant component (at use concentration) should be from about [0.001] *0.1%* to about [0.002] *0.2%* by weight, and within these limits, the preferred concentration is from about [0.0012] *0.12%* by weight to about [0.0015] *0.15%* by weight. When the compositions are used for stainless steel cleaning and brightening, the concentration of the sequestrant component should be from about [0.0006] *0.06%* to about [0.0060] *0.60%* by weight, and when the compositions are used for reverse roll iron phosphating, the concentration of the sequestrant component should be from about [0.0006] *0.06%* to about [0.0060] *0.60%*, again by weight. The combination of oxalic acid and citric acid appears to produce better results than that of either acid alone. Such improved results are obtained when the ratio of [oxalic] *citric* acid to [citric] *oxalic* acid is from about 2.25 to 1 to about 1.75 to 1, where the oxalic acid is expressed as oxalic acid dihydrate and the citric acid is expressed as anhydrous citric acid.

When the compositions of the present invention are used in aluminum cleaning, the sequestering component serves to increase the aluminum carrying capacity of the solution, and in this connection cooperates with the blend of acids of the acid component discussed above. In addition, the presence of citric acid in the sequestrant reduces the aluminum surface with satisfactory brightness. The oxalic acid, on the other hand, represses the corrosion rate of the solution on the stainless steel of the cleaning equipment. While the manner by which it does so is not fully understood, and there is no intention to be bound by a particular theory, it appears that the oxalic acid of the composition forms a very thin protective film on the stainless steel surface and thus reduces the corrosion rate.

In the context of stainless steel cleaning and brightening, the sequestrant component functions to complex the dissolved oxides forming the scale, and to prevent their redeposition on the metal surface. In the context of reverse roll iron phosphating, both the oxalic acid and the citric acid contribute to dissolving the required amount of iron from the ferriferous surfaces being treated, and thus increase the ferrous ion concentration at the coating site, so that a uniform phospate coating will form in the short time available for its formation inherent in the reverse roll [ion] *iron* phosphating method.

In the preferred forms of the composition of the present invention, a temperature stabilizer is also included as a component. This may conveniently be triethylene glycol. This component serves to stabilize the concentrate when it is subjected to freezing conditions in the course of warehousing or shipping. In addition to lowering the freezing point of the aqueous concentrate, it also retards the formation of precipitates when the concentrate is repeatedly frozen and thawed. Such precipitates are undesirable since they subtract components from the solution nonuniformly and thus alter the balance of the solution, unless care is taken to bring the precipitates back into dissolved state before use.

A preferred concentrate in accordance with the present invention has the following formula:

| | Percent by weight |
|---|---|
| 75% phosphoric acid | 11.0 |
| 66° Be.' sulphuric acid | 12.8 |
| Primary ethoxylated alcohol (Neodol 25–7) | 8.0 |
| Modified polyethoxylated straight chain alcohol (Triton DF–18) | 4.6 |
| Oxalic acid, dihydrate | 2.0 |
| Citric acid, anhydrous | 4.2 |
| Triethylene glycol | 1.0 |
| Water | 56.4 |

The percentage of components listed above may be varied somewhat to produce other concentrates, so long as care is taken to maintain the ratios of materials forming each component within the ranges set out above, and to maintain the proportion of each component so that upon dilution to use concentration the above stated concentration ranges are achieved. In addition, as noted before, the temperature stabilizing material (triethylene glycol) may be omitted if expected shipping and storage conditions make it unnecessary.

When used for aluminum cleaning purposes, the foregoing concentrate is preferably diluted with additional water in a ratio of about 1 part concentrate to about 50 parts water, although good cleaning can be obtained over a dilution of from about 1 to 67 to about 1 to 40, thus producing component ranges as discussed above. Best results are obtained when the diluted solution is heated, and the preferred temperature ranges are from about 185° F. to about 195° F. At the preferred dilution the pH will be from about 1.4 to about 1.5 (measured at room temperature) and in any event it is prefererd that the pH be kept well below 2.0. Under these conditions, excellent cleaning of aluminum results; even cans with emulsified drawing oil as one of the soils on the surface, are very satisfactorily cleaned when exposed to a spray of the solution for a suitable time, such as about 60 seconds.

The above concentrate effectively descales, cleans and brightens stainless steel when it is diluted with water in a ratio of from about 0.01 to 1 to about 0.05 to 1. The descaling and cleaning is best carried out when the solution is at a temperature of from about 160° F. to about 180° F. The length of treatment will depend to some extent upon the degree to which the stainless steel is coated with annealing scale and other soil, but in general, if the solution is contacted with the stainless steel for about 17 to 60 seconds, adequate cleaning and brightening will be obtained.

The preferred concentrate set forth above can be used to apply an iron phosphate coating to a ferriferous surface by the reverse roll coat method, and when it is so used, it is preferably diluted with water in a ratio of from about 0.03 to 1 to about 0.05 to 1. The surface speed of the reverse roller in such an operation should be between about 51% of the speed of the metal surface being coated, and a speed just insufficient, in view of the diameter and rotational velocity of the roller, to cause solution to be thrown from the surface thereof by centifugal force (usually about 300% of the metal surface speed). The dwell time of the solution on the surface prior to squeegeeing or wiping should be a minimum of about 5 seconds.

The data presented in Table I below illustrates the improvement in results obtained by the compositions of the present invention over the results obtained by two operative prior art solutions, one based solely on phosphoric acid and the other based solely on sulphuric acid. The performance criteria used to express the comparison are formalized and quantitized measures of the properties required for good aluminum can cleaning. Table I also illustrates the effect of varying the total concentration of an acid component, as well as the effect of varying the ratio of sulphuric acid to phosphoric acid.

In Table I below the column headed "Cleaning percent $H_2O$ Break" reports the degree to which the water breaks, that is, the percentage of the surface area to which a thin continuous film of rinse water fails to adhere when the surface is cleaned and then rinsed. The reported percentages in Table I reflect the relative abilties of the solutions to clean aluminum so well that ordinary rinse water forms a thin continuous sheet on the surface, and are based on a visual evaluation made when drawn and ironed aluminum cans were sprayed for about 55 seconds at about 180° F. and then rinsed. A low percent water break represents a good cleaning performance by this criterion, since discontinuities are caused by residual oily areas which were not removed by the solution during the cleaning cycle.

The column headed "Smut" reports a visual rating of the degree of smut left on the cans after being cleaned in the manner described above. The rating scale employed was as follows:

0—Trace
1—Slight
2—Moderate
3—Heavy

The column headed "Foam, mm." reports foam heights in millimeters for each sample at a 1.5% concentration when the foam was generated in a test machine designed for that purpose. This test machine is basically a cylindrical container with a spray impingement plate at the top thereof. A spray head is mounted to direct solution upwardly against the spray impingement plate. Solution is drawn from the bottom of the cylinder and pumped through the spray head at a pressure of 20 p.s.i. and at a selected temperature. After a period, a stable head of foam forms on top of the solution in the cylinder, and it is the height of this foam layer which is reported in Table I. A low foam height is desirable.

The column in Table I headed "Aluminum Dissolution Rate" reports in milligrams per square foot per minute the weight loss of aluminum cans cleaned for one minute at 180° F. with a spray pressure of 20 p.s.i. A low aluminum dissolution rate represents good performance.

The column headed "Static Corrosion" represents the penetration, expressed in mils per year, calculated from weight loss measurements made on type 316 stainless steel coupons treated with 1.5% solutions at 188° F. for 139 hours. A low static corrosion rate is a desirable property.

For some of the solutions there are reported in Table I the results of two types of dynamic corrosion tests. In the stirring test, the penetration in mils per year is reported, based on weight loss calculations for type 316 stainless steel panels treated for five hours in a vigorously stirred 1.5% solution at 190–200° F. Again, a low penetration represents good performance. The other dynamic corrosion tests are reported under the column headed "localized ebullition." In this test a 500 watt tubular heater was surrounded by a cylinder of type 316 stainless steel tubing sized so that the annular space between the heater and the cylinder had a thickness of approximately 1 millimeter. This cylinder was placed in two of the solutions at a concentration of 1.5% and the heater was used to maintain the solution at 200–210° F. for 10 hours. The solution was also vigirously stirred. The penetration was calculated from weight loss measurements on the stainless steel cylinder. A low weight loss represents good performance.

It should be understood that the volume percents for sulphuric acid and phosphoric acid reported in Table I are expressed as percentages of such acids in the concentrate, and that all of the concentrates were used in the tests as 1.5% by volume of the solutions.

Solutions 1 through 9 of Table I has as their other components surfactant systems made up of 8.68% primary ethoxylated alcohol (Neodol 25–7) and 4.93% modified polyethoxylated straight chain alcohol (Triton oxalic acid dihydrate, 2.08%, and citric acid anhydrous, 4.5%. The balance of each of the concentrates employed was water.

Solution 10 of the Table I had the formula:

| | Weight percent |
|---|---|
| 75% phosphoric acid | 25.97 |
| 70% glycolic acid | 3.58 |
| Primary ethoxylated alcohol (Neodol 25–7) | 8.61 |
| Modified polyethoxylated alcohol (Triton DF–18) | 4.43 |
| Citric acid anhydrous | 4.19 |
| Oxalic acid dihydrate | 2.08 |
| Triethylene glycol | 1.12 |
| Water | 50.02 |

Formula 11 of Table I contained:

| | Weight percent |
|---|---|
| Ammonium sulphate, technical | 20.8 |
| 56° Bé. sulphuric acid | 16.5 |
| Octyl phenoxy polyethoxyethanol (Triton X–102) | 0.8 |
| Water | 61.9 |

TABLE I

| | Volume, percent | | Cleaning | | Foam, mm. at— | | Aluminum dissolution rate, mg./ft.²/min. | Static corr., mil/yr. | Dynamic corrosion tests | |
|---|---|---|---|---|---|---|---|---|---|---|
| | $H_2SO_4$ | $H_3PO_4$ | Percent $H_2O$ break | Smut | 140° F. | 180° F. | | | Stirring, mil/yr. | Localized Ebullition, mil/yr. |
| Formula: | | | | | | | | | | |
| 1 | 14 | 6 | 80 | 1 | 44 | 12 | 15.38 | 2.325 | | |
| 2 | 12 | 8 | 70 | 2 | 50 | 12 | 14.73 | 0.449 | | |
| 3 | 10 | 10 | 30 | 1 | 52 | 14 | 17.65 | 1.485 | | |
| 4 | 8 | 12 | 40 | 2 | 47 | 11 | 19.28 | 0.1276 | | |
| 5 | 6 | 14 | 10 | 1 | 50 | 9 | 20.00 | 0.1224 | | |
| 6 | 4 | 16 | 20 | 2 | 35 | 12 | 19.78 | 0.0918 | | |
| 7 | 7.5 | 7.5 | 5 | 0 | 40 | 6 | 13.70 | 0.0039 | 0.643 | 0.1416 |
| 8 | 6.0 | 9.0 | 10 | 1 | 47 | 5 | 15.05 | 0.0193 | 0.428 | |
| 9 | 4.5 | 10.5 | 5 | 0 | 55 | 10 | 12.63 | 0.0193 | | |
| 10 | | 19 | 80 | 1 | 61 | 13 | 16.69 | 0.0511 | 0.857 | |
| 11 | 11 | | 80 | 3 | 65 | 18 | 9.07 | 0.1022 | 0.857 | 0.3625 |
| Water | | | | | | | 5.50 | | | |

The data of Table I illustrates and emphasizes some of the points made in the discussion above. For example, Formula 11, the sulphuric acid based solution, displays a relatively low aluminum dissolution rate, but it is a relatively poor cleaner with a high water break and an objectionable amount of smut. In addition, the solution is objectionably corrosive to stainless steel. The other prior art solution, Formula 10, which is based solely on phosphoric acid, is somewhat better as a cleaner than Formula 11, but has a significantly higher aluminum dissolution rate and a relatively high rate of attack or corrosion on stainless steel. In addition, it shows a weakness in cleaning ability in that it has a relatively high water break.

By contrast, solutions containing both acids show good cleaning performance with respect to smut in all cases, and as the preferred concentrations and acid ratios are approached, a material improvement in cleaning performance as measured by water break. Even Formula 1, the poorest of the acid blends, showed a water break property equal to both Formulas 10 and 11.

Formulas 7, 8 and 9, which represent the preferred ranges and acid ratios for aluminum cleaning, are far superior to prior art Formulas 10 and 11 with respect to stainless steel corrosion (static and dynamic) are far superior in cleaning ability as measured by smut, are lower foaming, and have acceptable aluminum dissolution rates which are higher than that of Formula 11, but lower than that of Formula 10. The overall performance of Formula 7 was the best.

Table II below reports a comparison between Formula 7 of the invention and prior art solution Formula 10 with respect to aluminum carrying capacity. In this experiment, the surfactant component was omitted from both solutions to prevent it from masking detection of precipitate. Aluminum was suspended in 1½% solutions of concentrates 7 and 10 and the solution was heated to 200° F. by an electric heater with a stainless steel jacket. The heater was frequently partially removed from the test bath and inspected to determine the point at which precipitation in the form of scale started to appear on the stainless steel jacket, and the aluminum concentration was measured when such precipitation first occurred. As Table II shows, the aluminum carrying capacity in grams/liter of Formula 7 was nearly three times that of Formula 10.

TABLE II

| | Volume percent | | Aluminum concentration when precipitation began, g./l. |
|---|---|---|---|
| | $H_2SO_4$ | $H_3PO_4$ | |
| Formula: | | | |
| 7 | 7.5 | 7.5 | 0.766 |
| 10 | | 19 | 0.251 |

The use of the compositions of the present invention for cleaning, deoxidizing, and brightening stainless steel is illustrated by the following example:

EXAMPLE I

Type 316 stainless steel was immersed in an aqueous bath containing 4% by volume of the above preferred concentrate. The temperature of the bath was about 180° F., and the metal was immersed for about 45 seconds. Upon removal from the bath and rinsing, the stainless steel was inspected and found to be clean and bright, and free of scale and evidence of pitting.

The use of the compositions of the present invention for application of an iron phosphate coating on ferriferous surfaces by the reverse roll coating method is illustrated by the following example:

EXAMPLE II

Steel coupons were processed on a pilot scale reverse roll coating apparatus operated at a metal surface speed equivalent to 150 feet per minute, with the reverse roller surface speed equal to 100% of the metal surface speed. A 5% aqueous solution was applied to the steel surface by the reverse roller, and allowed to dwell on the surface for 6 seconds. After squeegeeing, rinsing and drying, the coupons were painted and then subjected to a standard cup and ball impact test for paint adhesion. The paint adhesion as so measured was equivalent to results generally obtained when conventional iron phosphate solutions applied to steel in a conventional manner are evaluated under paint in the same way. The preferred concentrate was used to form the 5% solution.

From the foregoing it can be seen that in accordance with the present invention compositions of great versatility are provided for use in treating metal surfaces.

I claim:

1. A concentrated composition suitable, upon dilution with water, for cleaning of aluminum surfaces, for deoxidizing and cleaning of stainless steel, and for forming an iron phosphate coating on ferriferous surfaces, comprising an aqueous solution of:

an acid component consisting of sulfuric acid and phosphoric acid in a volume ratio of from about 0.5 to 1 to about 1.5 to 1 (calculated as 66° Bé, sulfuric acid/75% phosphoric acid);

a surfactant component;

and a sequestrant component consisting of [oxalic] *citric* acid and [citric] *oxalic* acid in a weight ratio of from about 2.25 to 1 to about 1.75 to 1 (calculated as [oxalic acid dihydrate/anhydrous citric acid] *anhydrous citric acid/oxalic acid hydrate*);

said components being present in the concentrate in amounts sufficient, upon dilution of the concentrate with water, to produce a solution for cleaning aluminum in which the concentration of the acid component is between about [0.001] *0.1%* and about [0.005] *0.5%* by weight, the concentration of the surfactant component is between about [0.0010] *0.10%* and about [0.0035] *0.35%* by weight, and the concentration of the sequestrant component is between about [0.001] *0.1%* and about [0.002] *0.2%* by weight, and to produce a solution for cleaning and deoxidizing stainless steel in which the concentration of the acid component is between about [0.003] *0.3%* and about [0.015] *1.5%* by weight, the concentration of the surfactant component is between about [0.003] *0.3%* and about [0.007] *0.7%* by weight, and concentration of the sequestrant component is between about [0.0006] *0.06%* and about [0.0060] *0.60%* by weight, and further to produce an iron phosphating solution in which the concentration of the acid component is between about [0.0015] *0.15%* and about [0.015] *1.5%* by weight, the concentration of the surfactant component is between about [0.013] *0.13%* and about [0.013] *1.3%* by weight, and the concentration of the sequestrant component between [0.0006] *0.06%* and about [0.0060] *0.60%* by weight.

2. A composition according to claim 1 in which the volume ratio of sulfuric acid and phosphoric acid in said acid component is between about 0.8 to 1 and about 1.2 to 1 (calculated as 66° Bé. sulfuric acid/75% phosphoric acid.

3. A composition according to claim 1 in which said surfactant component consists of primary ethoxylated alcohol and modified polyethoxylated straight chain alcohol.

4. A composition according to claim 3 in which the weight ratio of primary ethoxylated to modified polyethoxylated straight chain alcohol is between about 2.25 to 1 and about 1.75 to 1.

5. A composition according to claim 1 and further comprising about 1% [tri ethylene] *triethylene* glycol.

6. A concentrate useful upon dilution with water for treatment of metal surfaces consisting essentially of an aqueous solution containing about 11% by weight phosphoric acid (calculated as 75% phosphoric acid), about 12.8% by weight sulfuric acid (calculated as 66° Bé. sulfuric acid), about 8.0% by weight primary ethoxylated alcohol, about 4.6% modified polyethoxylated straight chain alcohol, about 2.0% by weight oxalic acid (calculated as oxalic acid dihydrate) and about 4.2% by weight citric acid (calculated as anhydrous citric acid).

7. A concentrate according to claim 6 and further containing about 1% [tri ethylene] *triethylene* glycol.

8. A solution for cleaning aluminum surfaces comprising an aqueous solution consisting essentially of:

an acid component consisting of sulfuric acid and phosphoric acid in a volume ratio of from about 0.5 to 1 to about 1.5 to 1 (calculated as 66° Bé. sulfuric acid/75% phosphoric acid), the concentration of said acid component being between about [0.001] *0.1%* and about [0.005] *0.5%* by weight, a surfactant component in an amount between about [0.0010] *0.10%* and about [0.0035] *0.35%* by weight, and a sequestrant component consisting of [oxalic] *citric* acid and [citric] *oxalic* acid in a weight ratio of from about 2.25 to 1 to about 1.75 to 1 (calculated as [oxalic acid dihydrate/anhydrous citric acid] *anhydrous citric acid/oxalic acid dihydrate*), the concentration of said sequestrant component being between about [0.001] *0.1%* and about [0.002] *0.2%* by weight.

9. A solution in accordance with claim 8 in which the concentration of said acid component is between about [0.0025] *0.25%* and about [0.0035] *0.35%* by weight.

10. A solution in accordance with claim 8 in which the surfactant component consists of primary ethoxylated alcohol and modified polyethoxylated straight chain alcohol in a ratio of from about 2.25 to 1 to about 1.75 to 1.

11. A solution in accordance with claim 8 in which the concentration of said sequestrant component is between about [0.0012] *0.12%* and about [0.0015] *0.15%* by weight.

12. A solution for cleaning deoxidizing and brightening stainless steel comprising an aqueous solution consisting essentially of:

an acid component consisting of sulfuric acid and phosphoric acid in a volume ratio of from about 0.5 to 1 to about 1.5 to 1 (calculated as 66° Bé. sulfuric acid/75% phosphoric acid), the concentration of said acid component being between about [0.003] *0.3%* and about [0.015] *1.5%* by weight, a surfactant component in an amount between about [0.003] *0.3%* and about [0.007] *0.7%* by weight, and a sequestrant component consisting of [oxalic] *citric* acid and [citric] *oxalic* acid in a weight ratio of from about 2.25 to 1 to about 1.75 to 1 (calculated as [oxalic acid dihydrate/anhydrous citric acid] *anhydrous citric acid/oxalic acid dihydrate*), the concentration of said sequestrant component being between about [0.0006] *0.06%* and about [0.0060] *0.60%* by weight.

13. A solution in accordance with claim 12 in which the concentration of said acid component is between about [0.004] *0.4%* and about [0.0075] *0.75%* by weight.

14. A solution in accordance with claim 12 in which the surfactant component consists of primary ethoxylated alcohol and modified polyethoxylated straight chain alcohol in a ratio of from about 2.25 to 1 to about 1.75 to 1.

15. A solution for applying an iron phosphate coating to ferriferous surfaces comprising an aqueous solution consisting essentially of:

an acid component consisting of sulfuric acid and phosphoric acid in a volume ratio of from about 0.5 to 1 to about 1.5 to 1 (calculated as 66° Bé. sulfuric acid/75% phosphoric acid), the concentration of said acid component being between about [0.0015] *0.15%* and about [0.015] *1.5%* by weight, a surfactant in an amount between about [0.0013] *0.13%* and about [0.013] *1.3%* by weight, and a sequestrant component consisting of [oxalic] *citric* acid and [citric] *oxalic* acid in a weight ratio of from about 2.25 to 1 to about 1.75 to 1 (calculated as [oxalic acid dihydrate/anhydrous citric acid] *anhydrous citric acid/oxalic acid dihydrate*), the concentration of said sequestrant component being between about [0.0006] *0.06%* and about [0.0060] *0.60%* by weight.

16. A solution in accordance with claim 15 in which the concentration of said acid component is between about [0.0075] *0.75%* and about [0.0105] *1.05%* by weight.

17. A solution in accordance with claim 15 in which the surfactant component consists of primary ethoxylated alcohol and modified polyethoxylated straight chain alcohol in a ratio of from about 2.25 to 1 to about 1.75 to 1.

18. A method for cleaning aluminum surfaces comprising contacting said surfaces with an aqueous solution consisting essentially of:

an acid component consisting of sulfuric acid and phosphoric acid in a volume ratio of from about 0.5 to 1 to about 1.5 to 1 (calculated as 66° Bé. sulfuric acid/75% phosphoric acid), the concentration of said acid component being between about [0.001] *0.1%* and about [0.005] *0.5%* by weight, a surfactant component in an amount between about [0.0010] *0.10%* and about [0.0035] *0.35%* by weight, and a sequestrant component consisting of [oxalic] *citric* acid and [citric] *oxalic* acid in a weight ratio of from about 2.25 to 1 to about 1.75 to 1 (calculated as [oxalic acid dihydrate/anhydrous citric acid] *anhydrous citric acid/oxalic acid dihydrate*), the concentration of said sequestrant component being between about [0.001] *0.1%* and about [0.002] *0.2%* by weight, and thereafter rinsing said surfaces.

19. A method for cleaning deoxidizing and brightening stainless steel surfaces comprising contacting said surfaces with an aqueous solution consisting essentially of:

an acid component consisting of sulfuric acid and phosphoric acid in a volume ratio of from about 0.5 to 1 to about 1.5 to 1 (calculated as 66° Bé. sulfuric acid/75% phosphoric acid), the concentration of said acid component being between about [0.003] *0.3%* and about [0.015] *1.5%* by weight, a surfactant component in an amount between about [0.003] *0.3%* and about [0.007] *0.7%* by weight, and a sequestrant component consisting of [oxalic] *citric* acid and [citric] *oxalic* acid in a weight ratio of from about 2.25 to 1 to about 1.75 to 1 (calculated as [oxalic acid dihydrate/anhydrous citric acid] *anhydrous citric acid/oxalic acid dihydrate*), the concentration of said sequestrant component being between about [0.0006] *0.06%* and about [0.0060] *0.60%* by weight.

20. A method for applying an iron phosphate coating to ferriferous surfaces comprising applying a reverse contact roll to a moving ferriferous surface [an] *and* aqueous solution consisting essentially of:

an acid component consisting of sulfuric acid and phosphoric acid in a volume ratio of from about 0.5 to 1 to about 1.5 to 1 (calculated as 66° Bé. sulfuric acid/75% phosphoric acid), the concentration of said acid component being between about [0.0015] *0.15%* and about [0.015] *1.5%* by weight, a surfactant component in an amount between about [0.0013] *0.13%* and about [0.013] *1.3%* by weight, and a sequestrant component consisting of [oxalic] *citric* acid and [citric] *oxalic* acid in a weight ratio of from about 2.25 to 1 to about 1.75 to 1 (calculated as [oxalic acid dihydrate/anhydrous citric acid] *anhydrous citric acid/ oxalic acid dihydrate*), the concentration of said sequestrant component being between about [0.0006] *0.06%* and about [0.0060] *0.60%* by weight, and allowing said solution to dwell on said surface for at least 5 seconds.

References Cited

The following references, cited by the Examiner, are of record in the patented file of this patent or the original patent.

UNITED STATES PATENTS

| | | | |
|---|---|---|---|
| 2,662,814 | 12/1953 | Swihart | 156—20 |
| 2,813,816 | 11/1957 | Otto | 148—6.17 |
| 3,523,835 | 8/1970 | Turner et al. | 148—6.24 |

J. H. STEINBERG, Primary Examiner

U.S. Cl. X.R.

156—18, 20, 22; 252—79.1; 148—6.15, 6.17